Patented Sept. 20, 1927.

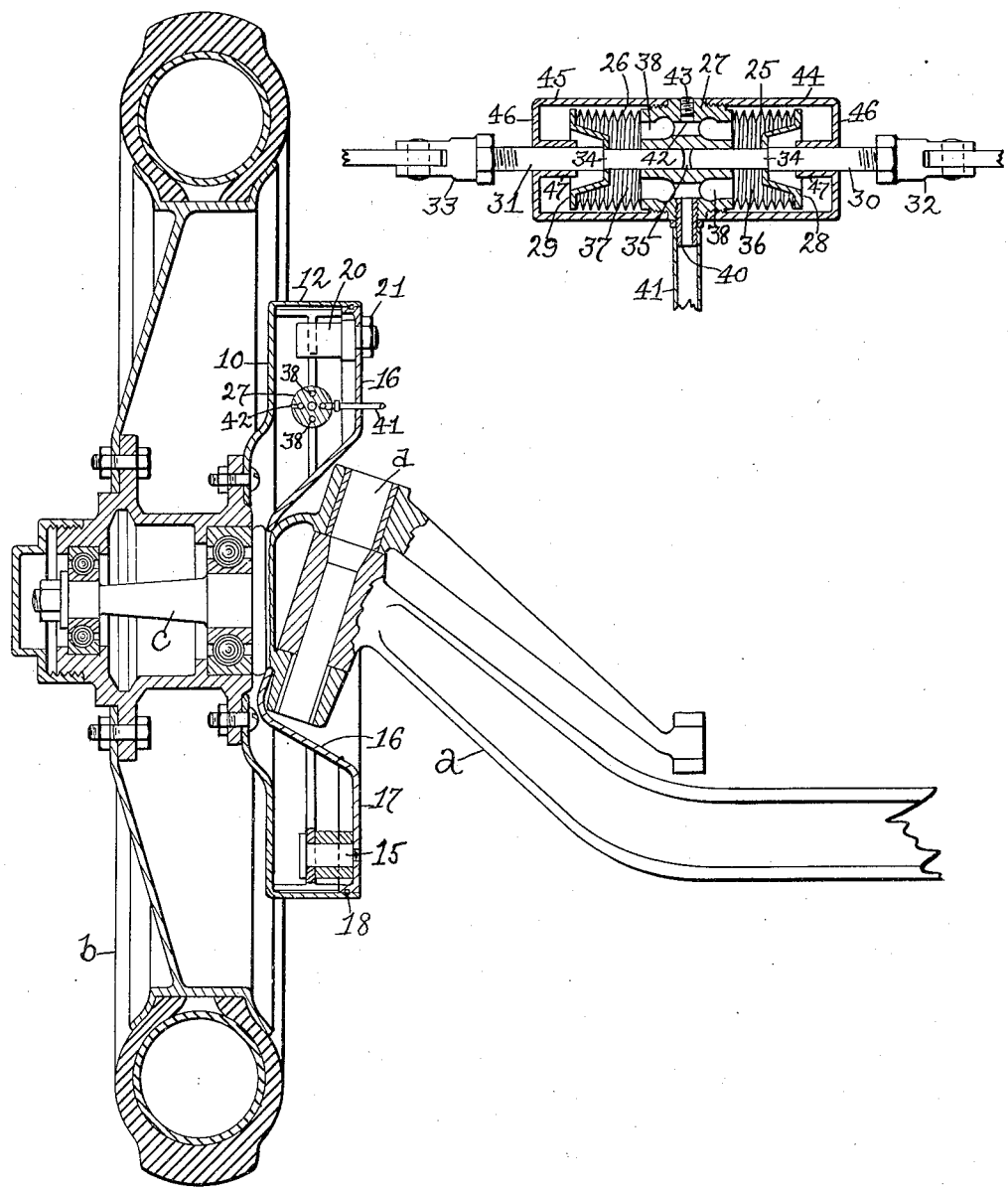

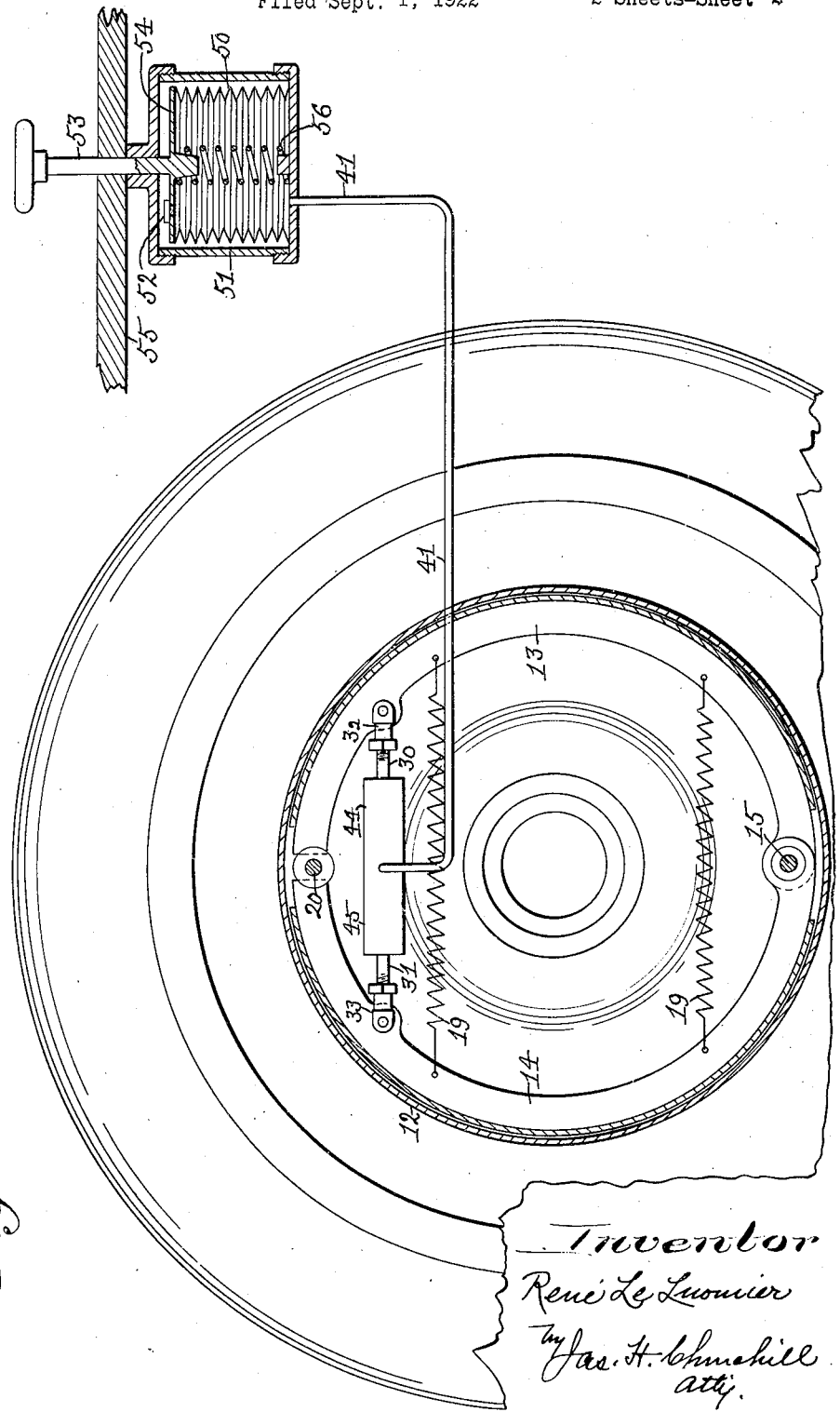

1,642,784

UNITED STATES PATENT OFFICE.

RENÉ LE LUOMIER, OF BOSTON, MASSACHUSETTS.

BRAKE MECHANISM.

Application filed September 1, 1922. Serial No. 585,667.

This invention relates to a novel brake mechanism especially designed and adapted for use on the front as well as the rear wheels of a motor vehicle, and which employs a fluid as a medium for applying the brakes.

The invention has for its object to provide a simple, inexpensive, durable and highly efficient brake mechanism for this purpose. To this end, I employ a closed circuit in which oil, alcohol, air or other fluid is reciprocated, and include in said circuit a primary metallic bellows, and a secondary metallic bellows, which latter is connected with the brake shoes to be supported thereby. It is preferred to employ two secondary metallic bellows arranged with their outer ends opposed and connected with the brake shoes, and having their inner ends connected with a head common to both bellows and provided with a fluid passage connecting said bellows and with a port which is connected with the primary bellows.

It is also preferred to provide a protective casing in which the secondary bellows are located, which casing is also supported by the brake shoes, as will be described. These and other features of this invention will be pointed out in the claim at the end of this specification.

Fig. 1 represents in elevation and section a portion of the front axle and a wheel thereon provided with a fluid operated brake mechanism embodying this invention.

Fig. 2 a detail showing in section the secondary bellows and in elevation the connection of the same to the brake shoes, and Fig. 3 a diagrammatic view to illustrate the method of operating the brake mechanism.

Referring to the drawing, *a* represents the stationary front axle of a motor vehicle, and *b* a wheel mounted to turn freely on the stub shaft *c* connected by the pivot pin *d* with the front axle *a* in a manner well understood.

The wheel *b* has attached to it a drum or casing 10 with whose rim 12 cooperate two brake shoes 13, 14 mounted at one end on a pivot 15 carried by a supporting member mounted on the stub shaft *c* and preferably made as a disk or plate 16 which is provided with an annular flange 17 extended into the rim 12 of the drum or casing 10 and forming a dust tight joint therewith by means of a suitable packing 18. The brake shoes 13, 14 are normally held out of contact with the rim 12 by one or more springs 19, which connect the brake shoes together as shown in Fig. 3, and which hold the free ends of said shoes against a stop, preferably a stud 20 detachably secured to the front disk or plate 16 by a nut 21 and having substantially flat opposite surfaces with which the ends of the brake shoes engage when they are in their normal or released position, shown in Fig. 3.

The brake shoes 13, 14 are forced into engagement with the rim 12 by a brake actuating mechanism, which comprises a closed circuit containing a fluid such as oil, alcohol, air or the like, which is reciprocated in said circuit as will be described.

The closed fluid-containing circuit consists of a secondary metallic bellows supported by the brake shoes, a primary metallic bellows carried by the vehicle and located in proximity to the operator's seat, and a pipe connecting said bellows.

The secondary metallic bellows may and preferably will be made as herein shown see Fig. 2, and is provided with two collapsible and expansible bellows or members 25, 26 attached fluid tight to an intermediate rigid head or member 27. The collapsible members or bellows 25, 26, are provided at their outer ends with heads 28, 29, through which are extended rods 30, 31, which are soldered, welded or otherwise secured fluid tight to said heads. The outer ends of the rods, 30, 31, are provided with adjustable clevises or members 32, 33, which are pivotally connected with the free ends of the brake shoes, and the inner ends of said rods, which are preferably reduced in diameter to form shoulders 34 for the heads 28, 29 to bear against, are extended into a central bore or passage 35 in the rigid intermediate head 27 and are supported by said head and movable in said passage or bore. The intermediate rigid head 27 divides the secondary metallic bellows into two fluid chambers 36, 37, which are in communication with each other by passages 38 extended through the intermediate rigid head 27. One of the passages 38 has connected with it a threaded nipple 40 to which one end of a pipe 41 is connected fluid tight. The pipe 41 may be a flexible hose. Another passage 38 may have extended from it an opening 42 which is normally closed by a screw plug 43 and through which fluid may be supplied to the circuit or system. The secondary metallic bellows may and preferably will be protected from injury by enclosing it in a casing composed of two parts 44, 45 which are screwed upon the rigid intermediate head 27 and are provided at their outer ends with heads 46 through which the rods 31 are extended. The heads 46 may and preferably will be provided with bearing hubs 47 for said rods. By reference to Figs. 2 and 3, it will be seen that when fluid is forced into the secondary bellows, the outer heads 28, 29 of the same are moved outwardly in opposite directions and the rods 30, 31 moving with said heads move the brake shoes 13, 14 into engagement with the rim 12 of the brake drum and thus stop rotation of the wheel. When the fluid pressure upon the heads 28, 29 is reduced, the springs 19 release the brake shoes and move them into engagement with the stop 20.

The fluid is forced into the secondary bellows, by the operator of the vehicle compressing the primary metallic bellows 50 with which the pipe 41 is connected. The primary bellows 50 is shown as located in a protective casing 51 which is suitably fastened to the vehicle. The primary bellows may be provided with an opening normally closed by a screw plug or cap 52. The primary bellows may be operated in any suitable manner and is represented as having a rod 53 attached to its movable head 54 and extended through a wall 55 of the vehicle. When pressure is applied to the rod 53, the head 54 of the primary bellows is moved toward the bottom thereof, and forces the fluid from the primary bellows through the pipe 41 into the secondary bellows 25, 26 to apply the brakes. When pressure is relieved from the head 54 of the primary bellows, the latter expands under the influence of the spring 56 and the pressure on the heads of the secondary bellows, which forces the fluid out from the latter and through the pipe 41 into the primary bellows.

By reference to Figs. 2 and 3, it will be observed that the heads 28, 29 of the secondary bellows are rigidly attached to the rods 30, 31, which are pivotally attached to the brake shoes and therefore the secondary bellows is supported by the brake shoes and practically floats in air, and the protective casing 44, 45 also floats in air being supported by the rods 30, 31 and the intermediate head of the secondary bellows. In the present instance, the primary bellows is shown as connected with the brake operating bellows of a single wheel, but in practice it is designed to connect it with the secondary bellows on all four wheels of the vehicle. It will be observed that the fluid, which actuates the secondary bellows is confined in a fluid tight closed system from which no opportunity to escape is afforded, as there are no check valves, packing, piston rings or the like employed in the closed system, which would afford opportunity for loss of fluid. The apparatus when once installed requires no readjustment of parts, and the working is unaffected by climatic changes, is self-contained, and independent of outside mechanical forces for its action. Furthermore, it is simple, durable, inexpensive and highly efficient.

A preferred embodiment of the invention is herein shown, but it is not desired to limit the invention to the particular construction shown.

Claim:

The combination with a fluid actuator having expansible and collapsible metallic members provided with a fluid inlet and having their inner ends in open communication with said fluid inlet and provided at their outer ends with rigid heads attached fluid-tight to said metallic members and simultaneously movable away from each other by fluid-pressure admitted into said metallic members, of a protective casing for said fluid-actuator provided with heads, and rods attached to the rigid heads of the said actuator and guided by the heads of said protective casing.

In testimony whereof, I have signed my name to this specification.

RENÉ LE LUOMIER.